US010699303B2

United States Patent
Ismail et al.

(10) Patent No.: US 10,699,303 B2
(45) Date of Patent: Jun. 30, 2020

(54) CROSS-CHANNEL CORRELATION OF CONSUMER TELEPHONE NUMBERS AND USER IDENTIFIERS

(71) Applicant: Marchex, Inc., Seattle, WA (US)

(72) Inventors: Ziad Ismail, Seattle, WA (US); Chris Kolbegger, Bainbridge Island, WA (US)

(73) Assignee: Marchex, Inc., Seattle, WA (US)

( * ) Notice: Subject to any disclaimer, the term of this patent is extended or adjusted under 35 U.S.C. 154(b) by 672 days.

(21) Appl. No.: 15/019,826

(22) Filed: Feb. 9, 2016

(65) Prior Publication Data

US 2016/0155148 A1 Jun. 2, 2016

Related U.S. Application Data

(63) Continuation of application No. 13/865,966, filed on Apr. 18, 2013, now Pat. No. 10,475,075.

(Continued)

(51) Int. Cl.
*G06Q 30/00* (2012.01)
*G06Q 30/02* (2012.01)
*H04M 3/22* (2006.01)

(52) U.S. Cl.
CPC ..... *G06Q 30/0257* (2013.01); *G06Q 30/0251* (2013.01); *H04M 3/2218* (2013.01)

(58) Field of Classification Search
None
See application file for complete search history.

(56) References Cited

U.S. PATENT DOCUMENTS 7,092,370 B2 8/2006 Jiang et al.
7,970,909 B1 6/2011 Cox et al.
(Continued)

FOREIGN PATENT DOCUMENTS

| JP | 2002118660 A | * | 4/2002 | ............ H04M 3/51 |
| JP | 2004015763 A | * | 1/2004 | ............ H04M 3/51 |
| JP | 2013070188 A | * | 4/2013 | ............ H04M 3/493 |

OTHER PUBLICATIONS

Nielson. Nielsen Audience Watch User Guide. (Aug. 2011). Retrieved online Feb. 24, 2020. https://www/nielsen.com/wp-content/uploads/sites/3/2019/04/AW-UserGuide.pdf (Year: 2011).*

(Continued)

*Primary Examiner* — James A Reagan
(74) *Attorney, Agent, or Firm* — Perkins Coie LLP

(57) ABSTRACT

A method and system that performs cross-channel correlation of user identifiers with consumer telephone numbers. The system receives impression data characterizing the exposure of users to mechanisms for contacting businesses, the impression data including associated phone number and a date and time for each of the exposures. The system also receives call data describing telephone calls to businesses, the call data including a caller telephone number, a callee telephone number, and a date and time for each of the calls. Based on matching impression telephone numbers and call data callee numbers, the system forms correlations between corresponding user identifiers and caller telephone numbers. Correlations are also assigned a confidence level, based on the date and time of the corresponding exposures and telephone calls, that reflects the likelihood that a user associated with the correlated user identifier is the same as the user associated with the correlated caller telephone number.

18 Claims, 6 Drawing Sheets

Related U.S. Application Data

(60) Provisional application No. 61/801,893, filed on Mar. 15, 2013.

(56) References Cited

U.S. PATENT DOCUMENTS

| | | | |
|---|---|---|---|
| 8,238,540 B1* | 8/2012 | Duva | H04M 3/51 |
| | | | 379/265.01 |
| 2006/0041470 A1* | 2/2006 | Filho | G06Q 10/00 |
| | | | 705/14.64 |
| 2008/0189177 A1 | 8/2008 | Anderton et al. | |
| 2009/0017805 A1 | 1/2009 | Sarukkai | |
| 2011/0282739 A1 | 11/2011 | Mashinsky et al. | |
| 2012/0004978 A1 | 1/2012 | Kothari et al. | |
| 2012/0177189 A1 | 7/2012 | Chatterjee et al. | |
| 2013/0035078 A1* | 2/2013 | Skog | G06Q 30/02 |
| | | | 455/414.1 |
| 2013/0294588 A1 | 11/2013 | Burger et al. | |
| 2014/0114750 A1 | 4/2014 | Jung | |
| 2014/0164171 A1 | 6/2014 | Lu et al. | |

OTHER PUBLICATIONS

Koole et al. Queueing Models of Call Centers An Introduction. (Oct. 9, 2001). Retrieved online Feb. 24, 2020. http://www.columbia.edu/~ww2040/cc_review.pdf (Year: 2001).*

University of Florida. Guidelines for Measuring the Effectiveness of PR Programs and Activities. (2003). Retrieved online Feb. 24, 2020. https://www.instituteforpr.org/wp-content/uploads/2002_MeasuringPrograms.pdf (Year: 2003).*

* cited by examiner

| 310 Ref. # | 312 User phone number | 314 Time and date stamp | 316 Transactions | 318 Other |
|---|---|---|---|---|
| 113 | 608-555-1212 | 7/7/2012 08:45:23 | Address inquiry | |
| 114 | 425-555-1212 | 7/7/2012 09:55:04 | Sought product return (ticket #3432) | |
| 115 | 360-555-1234 | 7/7/2012 09:57:06 | Purchased extended warranty | |
| 116 | 415-555-1234 | 7/7/2012 09:59:12 | Terminated by caller | |
| ... | ... | ... | ... | ... |

*FIG. 3*

| Ref. # | User phone number | Masked User ID | Publisher | Confidence level | ID/Pub/ Conf. Level | ID/Pub/ Conf. Level | Other user information |
|---|---|---|---|---|---|---|---|
| 410 | 412 | 414 | 416 | 418 | 420b | 420n | 422 |
| AA | 206-555-1212 | dofBUS | Yahoo! | 90% | ... | ... | ... |
| AB | 360-555-1234 | 53843DC484 | Facebook | 100% | ... | ... | ... |
| AC | 608-555-1212 | asgIEB | Google | 70% | ... | ... | ... |
| ... | | | | | | | |

*FIG. 4*

CROSS-CHANNEL CORRELATION OF CONSUMER TELEPHONE NUMBERS AND USER IDENTIFIERS

CROSS-REFERENCE TO RELATED APPLICATION(S)

This application is a continuation of U.S. patent application Ser. No. 13/865,966, entitled "CORRELATED CONSUMER TELEPHONE NUMBERS AND USER IDENTIFIERS FOR ADVERTISING RETARGETING," filed Apr. 18, 2013, which claims the benefit of U.S. Provisional Patent Application No. 61/801,893, entitled "CROSS-CHANNEL TARGETING USING HISTORICAL ONLINE AND CALL DATA," filed Mar. 15, 2013, all of which are incorporated herein by reference in their entireties.

BACKGROUND

Businesses nowadays interact with customers and prospective customers using a variety of communication channels, such as via wired or wireless telephone networks, the Internet, interactive television systems, and in-person at brick-and-mortar stores. Although each communication channel can be somewhat successful by itself in reaching any particular customer, there exists information inefficiencies when a customer interacts with the businesses across more than one of the communication channels. For example, if a potential customer is using a telephone system to enquire about the products or services of a business, but does not complete a transaction, the business is rarely able to re-engage with the customer. Although the business would like to target the potential customer with advertising in the hopes of completing a sale, there is no convenient mechanism to do so. The business may call the potential customer back, but such an approach is considered intrusive and off-putting by many customers. At best, the business must hope that the customer randomly stumbles across advertising associated with the business, or is sufficiently motivated to call or visit the business again in the future. The ability to leverage the fact that the consumer used a phone to contact the business is typically lost.

Thus, there is a need for a system and method that can take into consideration a consumer's engagement with a business via the phone and apply that information when determining which users to target for a marketing campaign conducted across a second communication channel, such as via online advertising.

BRIEF DESCRIPTION OF THE DRAWINGS

FIG. 3 is an exemplary data structure of interaction data provided by businesses to the cross-channel advertising system.

FIG. 4 is an exemplary data structure maintained in a cross-channel targeting database by the cross-channel advertising system.

DETAILED DESCRIPTION

Figure 1:
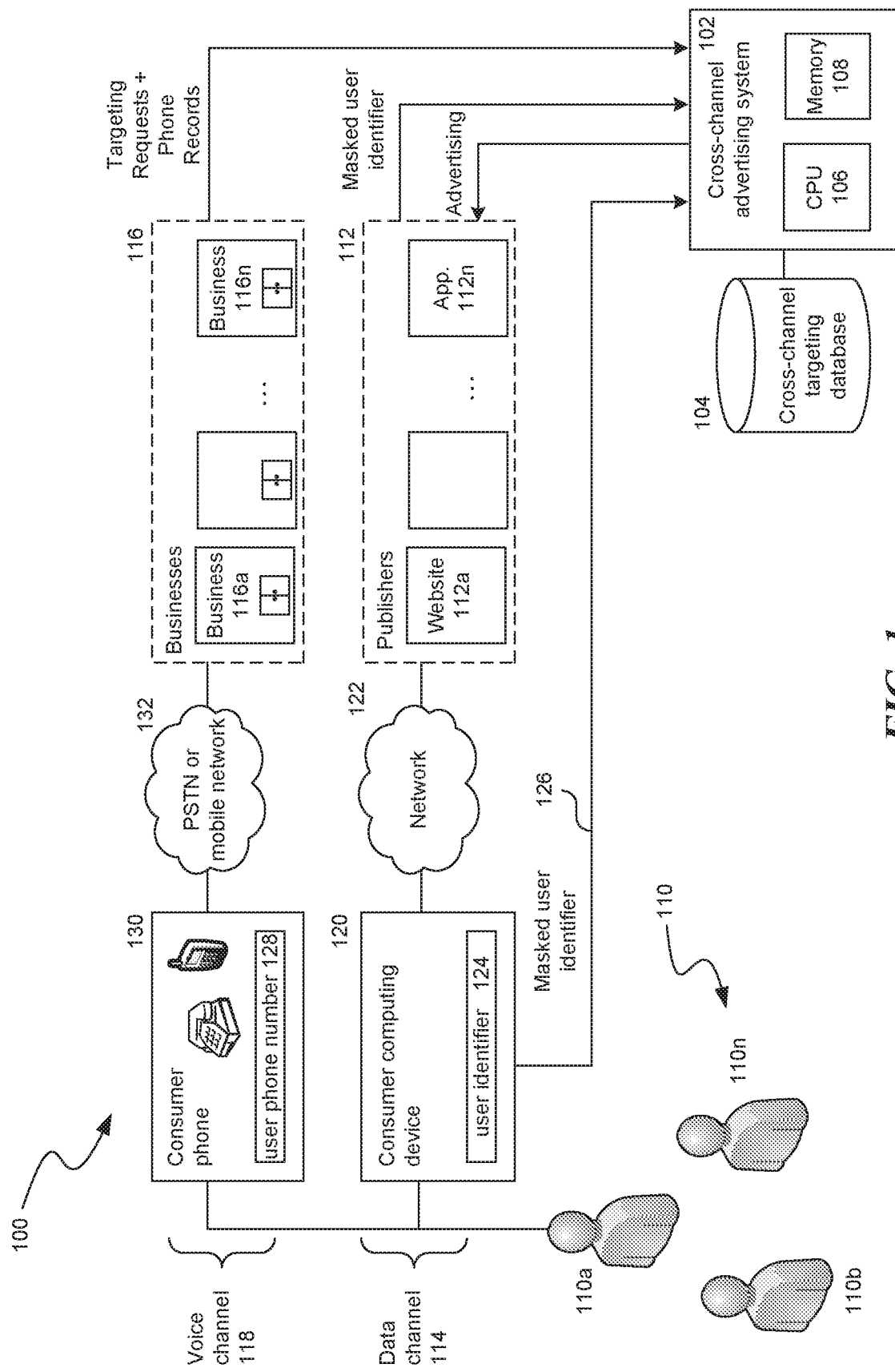
FIG. 1 is a block diagram of a system for cross-channel advertising in accordance with the disclosed technology, the system utilizing a cross-channel targeting database to allow consumers to be re-targeted based on their phone number.

A method and system that performs cross-channel advertisement targeting using historical online and call data is disclosed herein. The system utilizes a cross-channel targeting database to identify consumers that should be reengaged (or, "re-targeted") on behalf of a business via an alternate communication channel. The cross-channel targeting database correlates masked user identifiers representing online activities of consumers with telephone numbers associated with each consumer. A masked user identifier is provided by a website publisher or other party and is associated with a unique identifier that is used by the publisher or other party to track the online behavior of a consumer (e.g., a cookie, a device or subscriber identifier, a user ID). The correlation between unique user identifier (and hence masked identifier) and telephone number may be explicitly identified, such as when a consumer provides a phone number to a website as part of a log-in process or as part of a purchase of a good or service through the website. The correlation between unique user identifier (and hence masked identifier) and telephone number may also be implicitly identified, such as when a tracking telephone number is displayed in an advertisement on a consumer's computing device and a call is received to that tracking telephone number within a threshold period after display of the advertisement. Because of the inherent uncertainty in drawing correlations between unique user identifiers (and therefore masked user identifiers) and telephone numbers, the cross-channel targeting database may include a confidence level associated with the correlated value tuples (masked user ID, publisher ID, telephone number). The confidence level represents the likelihood that a particular telephone number is correlated with a particular masked user identifier for the identified publisher.

The cross-channel targeting database is used by the system to target advertisements to consumers. Businesses continually receive telephone calls from potential customers that do not result in a potential sale. For example, callers may call a business to ask questions about a product or seek details about a business (e.g., hours of operation, directions to the business). When a business receives calls from an individual, they are often able to identify the caller from caller ID. In order to target advertisements to those customers that have failed to convert as a result of the telephone call, businesses may provide the caller's telephone number and a desired advertisement or advertising campaign to the system. Using the cross-targeting database, the system identifies the masked user identifier or identifiers that is associated with the telephone number and the publisher or publishers that generated the masked user identifier or identifiers. The system uses the identified masked user identifiers and publishers to target the advertisement or advertising campaign to the consumer. The system thereby allows contacts to a business that are received on one channel (e.g., the telephone) to be re-engaged by targeted advertising in a second channel (e.g., via a browser application that receives advertisements over a network).

In some embodiments, the stored confidence level representing the likelihood of correspondence between a telephone number and a masked user identifier is used by the system to control the aggressiveness of re-targeting. A business may set a confidence threshold that they would like to have exceeded before re-targeting occurs. The confidence threshold value is specified by the business in order to control how broadly or narrowly the re-targeting campaign is to be focused. The system may also utilize various other re-targeting conditions and/or techniques to increase the accuracy and effectiveness of the re-targeting campaign. These additional criteria and techniques will be described in detail below.

Various embodiments of the invention will now be described with specific reference to the Drawings. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram illustrating a representative environment 100 in which a cross-channel advertising system 102 may operate. The system 102 utilizes a cross-channel targeting database 104 that correlates a telephone number of a consumer with a masked user identifier associated with that consumer. The correlation between telephone number and masked user identifier is used by the system to target advertisements to the consumer across a different channel than an original contact with the consumer occurred. The system 102 operates on one or more computing devices, such as server computers which may be configured in whole or in part as a web service. The system 102 utilizes one or more processors 106 ("CPU") to execute instructions that perform various actions and implement decision logic. The computer executable instructions are stored in volatile or non-volatile memory 108 along with other data.

Those skilled in the art will appreciate that the system 102 may be implemented on any computing system or device. Suitable computing systems or devices include personal computers, server computers, multiprocessor systems, microprocessor-based systems, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

The system 102 receives data associated with two types of interactions involving consumers 110. The first type of interaction is between consumers 110 and publishers 112 over a data channel 114. A record of the identity and/or interactions between the consumers and publishers over the data channel is used to populate the cross-channel targeting database 104. The second type of interaction is between consumers 110 and businesses 116 over a voice channel 118. A record of the identity and/or interactions between consumers and businesses over the voice channel may be used to populate the cross-channel database, but may also used by the system to identify potential customers on which to perform targeting advertising on behalf of a business. Each type of interaction will be described in turn.

In the first type of interaction, a consumer 110a uses a computing device 120 having a web browser or other application to interact with a publisher website 112a (e.g., Google, Yahoo!, New York Times, Facebook) or a publisher application 112n (e.g., an application installed on a mobile device). The computing device may be a personal computer, laptop computer, notebook computer, tablet computer, smartphone, portable media player, gaming device, or other computing device that allows a consumer to access websites or applications. The computing device 120 relies upon a network 122 such as the Internet to connect to publisher websites or applications. Network 122 may be any private or public, wired or wireless, network. The publisher website 112a is hosted on one or more web servers that serve content to the consumer. The consumer's computing device 120 fetches, displays, and interacts with the web server via HTTP or other supported communication protocol. To allow the consumer's online activity to be tracked, a publisher may use a unique user identifier 124 to track activities of the consumer each time an Internet domain accessed. The unique user identifier 124 may be a cookie associated with a browser, a unique device identifier such as an International Mobile Station Equipment Identity (IMEI) number, an International Mobile Subscriber Identifier (IMSI), or other identifier that may be placed on the computing device or read by the publisher. For example, if a consumer 110a visits a website, the publisher serving the domain may place a cookie on the consumer's computer or mobile device reflecting the website session and certain activities what were performed during the session. The publisher 112 maintains a record of the consumer's interaction with the website or application, including a record of any advertisements that were served by the publisher to the consumer's computing device. If the consumer 110 returns to a publisher's website, additional website actions and advertisements may be associated with the consumer by virtue of the stored cookie or other unique user identifier.

As part of the consumer's interaction with the publisher website and/or application, the publisher 112 may receive sufficient information to identify a telephone number 128 associated with the consumer, and correlate the identified telephone number 128 with the unique user identifier 124. For example, if the consumer is required to establish an account with the publisher 112 in order to access certain features of the publisher's website, during the account set-up process the consumer may be required to provide a telephone number at which the consumer can be reached. When the consumer subsequently returns to the publisher website and logs-in to the consumer's account to access the website features, the publisher 112 is thereby able to associate the online activities of the consumer, including any advertisements presented to the consumer, with the consumer's telephone number.

As another example of how a publisher 112 may receive sufficient information to correlate a telephone number 128 to the unique user identifier 124, the consumer may provide a telephone number as part of a transaction with a publisher website. For example, the consumer may order goods and services from the website by filling out a transaction form and including a name, address, phone number, payment information, and other details. If the consumer 110 expressly provides a phone number as part of a transaction with the website, the publisher 112 is thereby able to correlate the online activities of the consumer, including any advertisements presented to the consumer, with the consumer's telephone number.

On a continuous or periodic basis, publishers 112 may provide the cross-channel advertising system 102 with identity, impression, and/or activity data that the publishers compile as a result of monitoring consumer interaction with websites 112*a* or applications 112*n*. Because publishers may be reticent to share the actual unique user identifier 124, in some embodiments a publisher may apply a masking algorithm to the user identifier. That is, the publisher may apply a hash or other mathematical operation to the user identifier to mask the actual identifier from the cross-channel advertising system. Alternatively, the publisher may construct a table or other technique that maps the unique user identifier 124 to a generated masked user identifier. The publisher provides the masked user identifier to the cross-channel advertising system 102 rather than the actual user identifier 124. The purpose of the masked user identifier is to hide the actual value of the user identifier 124 from the cross-channel advertising system 102, yet still allow the publisher to correlate a received masked user identifier with a user identifier 124 in order to target a consumer with a desired advertisement. In some embodiments, instead of providing a masked user identifier the publisher provides the actual value of the user identifier 124 to the cross-channel advertising system 102. The actual value may be the cookie, IMEI, IMSI, media access control address (MAC address), hardware/software fingerprint, etc., of the consumer's computing device. In circumstances where the actual value of the user identifier 124 is provided by a publisher, the system 102 may be able to identify the same consumer across different publishers based on the provided user identifier. Although the figures and description primarily refer to masked user identifiers, it will be appreciated that the described techniques are similarly applicable to embodiments in which the actual value of the user user identifier 124 is provided by a publisher.

The identity, impression, and/or activity data may be transmitted by a publisher to the cross-channel advertising system 102 via an API, delivered via FTP, provided via storage media such as optical disk, etc. It will be appreciated that the cross-channel advertising system 102 may be operated by a third-party that is distinct from the publishers, or it may be operated by a publisher itself.

Figure 2A:
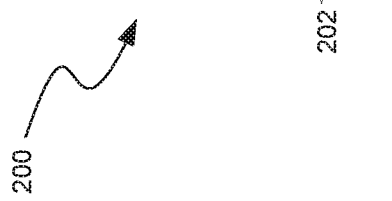
FIGS. 2A and 2B are exemplary data structures of identity, interaction, and/or activity data provided by publishers to the cross-channel advertising system.

FIG. 2A is an example of a representative data table 200 containing masked user identifiers that are provided by a publisher 112 to the system 102. A publisher identifier (not shown) is associated with the table and used to identify the corresponding publisher from which the data is received. The data in the table 200 is used by the system to build a profile of consumers for purposes of identifying re-targeting opportunities. Each row in the table 200 represents identity information that is generated as a result of a prior interaction of a consumer with the publisher via data channel 114. Each column in the table 200 represents different data fields that characterize the consumer. The first field is a reference number field 210 that contains a unique identifier that is assigned by the publisher 112 to the record. The reference number may be assigned by the publisher to facilitate data synching with the cross-channel advertising system 102. The second field is a masked user identifier field 210 that is populated with a masked user identifier provided by the publisher. A mapping is maintained by the publisher of each masked user identifier and a unique identifier associated with the consumer or the consumer's device. For example, the masked identifier may be mapped by the publisher to a cookie that is associated with the consumer's browser at the time of the interaction. As another example, the masked identifier may be mapped by the publisher to the IMEI of the computing device that the consumer used at the time of the interaction. It will be appreciated that other unique identifiers including, but not limited to, a media access control address (MAC address) or hardware/software fingerprint may also be used by a publisher to identify the computing device used by the consumer. In the depicted example, row 202 includes the masked user identifier (e.g., "5843DC484") provided by the publisher. A time and date field 216 may be populated by the system with a time and date stamp of when each record was received from the publisher. In the depicted example, the identity information was received from the publisher at 8:42 am on Dec. 12, 2012. As will be described in additional detail herein, the contents of the time and date field 216 may be used by the system to assess the likelihood that the associated identity data is still accurate.

It will be appreciated that while the information contained in table 200 is characterized as being received from a single publisher, the system 102 will typically receive information from multiple publishers. In those circumstances, the system may maintain multiple tables 200, each of which is associated with a corresponding publisher so that the system can track the source of the underlying data. Alternatively, each entry in a table 200 may have an assigned publisher ID so that the system can associate each entry in the table with the corresponding publisher from which it was received.

Figure 2B:

FIG. 2A depicts a minimal amount of information (masked user ID/user phone number) that may be received by the system 102 and used to construct the cross-channel targeting database 104. In contrast, FIG. 2B is an example of a more robust data table 250 that contains impression and activity data in addition to the identity information provided by a single publisher 112. The data in table 250 may be provided by publishers that are more willing to share impression or activity data with the system 102 in anticipation of receiving better advertising targeting.

The data in the table 250 is used by the system to build a profile of consumers for purposes of identifying re-targeting opportunities. Each row in the table 250 is a record of an interaction of a consumer with a publisher 112 via the data channel 114. Each column in the table 200 represents different data fields that characterize the interaction. For example, row 260 of the table corresponds to an advertisement that was delivered to a consumer by a publisher. The first four fields in table 250 serve the same purpose as the corresponding fields in table 200. That is, the reference number field 210 contains a unique identifier that is assigned by the publisher 112 to the interaction record. The masked user identifier field 210 contains a masked user identifier provided by the publisher. The time and date field 216 may be populated with a time and date stamp of when the consumer interaction occurred. In the depicted example, the consumer was presented with an advertisement at 8:42 am on Jul. 7, 2012.

In addition to the reference number and masked user identifier being provided by the publisher 112, additional pertinent information surrounding the consumer's interaction with the website or application may be provided by the publisher. The table 250 also contains an advertisement field 252 that may be populated with an indication of the one or more ads that were shown to the consumer during the interaction. In the depicted example, row 260 indicates that an advertisement was shown to the consumer, and that the presented advertisement included the tracking telephone number 1-800-{TRACKING #}. As will be described in additional detail herein, the number displayed in the advertisement may be used by the system to later identify the consumer that called the number. One skilled in the art will appreciate that although the phone number of the advertisement is shown in the table for convenience, the system may be able to identify the phone number by other means. For example, the cross-channel advertising system may be able to identify the phone number by analyzing the advertisement identified by the ad treatment number (e.g., #145343) in the ad field 252. Alternatively, the cross-channel advertising system 102 may have provided one or more tracking telephone numbers to the corresponding publisher for use in the ads, and the system therefore have previous knowledge of what telephone numbers would be contained in displayed advertisements.

The consumer interaction reflected in row 262 of the table 250 was associated with the display of an advertisement to the consumer. In contrast, the consumer interaction in row 264 represents a purchase of an item from the website by the consumer. The interaction represented by row 264 contains much of the same data characterizing the interaction as row 262, namely a reference number in field 210, a unique user identifier in field 212, and the time and date of the interaction in field 216. In addition, however, the interaction in row 264 is also characterized by information associated with the purchase. A user phone number field 214 contains a phone number (e.g., "206-255-1212") that the consumer provided to the publisher as part of the transaction. The phone number may be provided by the consumer at the time of purchase, or may be stored in an account that the user maintains with the publisher and accessed by providing log-in information to the publisher at the time of the transaction. A transactions field 254 contains a characterization of the consumer's transaction with the publisher. In the depicted example, the consumer is characterized as having "purchased Adidas soccer ball." It will be appreciated that a greater or lesser amount of information characterizing the purchase may be included in the transactions field, including a price, quantity, shipping information, etc. In addition, an "other" field 256 may be populated by the publisher 212 with any additional information that the publisher is willing to provide about the consumer's interaction with the publisher.

A third interaction is represented by the row 236 in the table 250. The row 236 represents an interaction where the consumer was presented with an advertisement by the publisher 212. In addition to all of the details surrounding the presentation of the advertisement to the consumer, the row 236 also contains a phone number (e.g., "414-555-1212") of the user. The phone number of the user may have been obtained by the publisher as a result of an account with the publisher that is maintained by the consumer.

It will be appreciated that while the information contained in table 250 is characterized as being received from a single publisher, the system 102 will typically receive information from multiple publishers. In those circumstances, a publisher ID (not shown) may be associated with the each received table 250 so that the system tracks the source of the underlying data.

It will be appreciated by one skilled in the art that the amount of interaction data that is provided by a publisher to the cross-channel advertising system 102 may vary from publisher-to-publisher. Some publishers 212 may be willing to provide significant details associated with consumer transactions, as doing so may allow the cross-channel advertising system 102 to better target advertisements to consumers that visit the publisher. Other publishers may be reticent to share much information with the advertising system 102, so may limit or curtail the amount of data that they provide to the system. As previously discussed, in minimal circumstances a publisher may be willing to provide a masked user identifier and a user phone number of a consumer to facilitate targeting of advertisements by the advertising system 102.

In addition to publishers 212 providing interaction data to the cross-channel advertising system 102, other parties may also have access to similar information that would allow correlation between a unique user identifier 124 associated with a consumer's computing device 120 and telephone number of the consumer. For example, if the user's computing device 120 is a smartphone, a vertically-integrated smartphone manufacturer (not shown) may have access to the telephone number associated with the device as well as a unique identifier (such as the IMEI) associated with the device. In addition, the smartphone manufacturer may be able to track the consumer's activities across publisher websites and applications. As such, the smartphone manufacturer would be able to provide similar information 126 to the cross-channel advertising system 102 as is contained in table 200. In particular, the smartphone manufacturer would be able to provide the masked user identifier and the telephone number of the smartphone that is used by the consumer.

The foregoing describes many of the different ways that the cross-channel advertising system 102 can receive information associated with consumer 110 interaction with publishers 112 via data channel 114. Returning to FIG. 1, the cross-channel advertising system 102 may also receive information associated with the interaction of consumers 110 with businesses 116 via the voice channel 118. To contact businesses 116, a consumer typically uses a telephone 128 that is owned or controlled by the consumer. For example, the telephone 128 may be the consumer's home phone, work phone, or mobile phone. In cases where the telephone 128 is the consumer's mobile phone, the mobile phone and the consumer's computing system 120 may be one and the same device. Consumer calls are made to a desired business 116a by dialing the phone number associated with that business. The dialed number allows the call to be routed through the public switched telephone network ("PSTN") or mobile phone network 132 to the business. Consumer calls may be directly routed to the desired business, or terminated at a call center that manages calls for that business. In some embodiments, a business or a call center may have an interactive voice response (IVR) system to automate the interaction with consumers 110 and reduce the required staffing levels to answer calls.

When a consumer dials a business, the business and/or call center may determine the phone number 128 associated with the consumer's phone 130 using a caller identification (caller ID) service. With a caller ID service, the consumer's number is transmitted to the business's telephone equipment during the ringing signal, or when the call is being set up but before the call is answered. The detected telephone number is captured and stored by the business. A record of the interaction between the business and the consumer may be maintained by the call center or business, and continuously or periodically provided to the cross-channel advertising system 102. The interaction data may be transmitted to the system via an API, delivered via FTP, provided via storage media such as optical disk, etc.

FIG. 3 is an example of a representative data table 300 containing interaction data that is provided by a business 116, or by a call center associated with a business, to the cross-channel advertising system 102. The data in the table 300 may be used by the system to build a profile of consumers for purposes of identifying re-targeting opportunities. Each row in the table 300 represents an interaction of a consumer with a business 116 via the voice channel 118. Each column in the table 300 represents a different data field that characterizes the interaction. For example, row 302 of the table corresponds to a call by a consumer to a business to inquire about the address of the business. The first field is a reference number field 310 that contains a unique identifier that is assigned by the business 116 to the interaction record. The reference number may be assigned by the business for purposes of internal tracking of the interaction with the consumer. The second field is a user phone number field 312 that contains a telephone number (e.g., "608-255-1212") of the consumer. As noted above, the phone number of the consumer may be automatically captured by the business or call center using caller ID. Alternatively, the consumer may voluntarily provide their telephone number to the business representative that assists them, or provide their telephone number to an IVR system that handles the call. A time and date field 314 is populated with a time and date stamp of when the consumer interaction occurred. In the depicted example, the interaction between the consumer and the business or call center occurred at 8:45 am on Jul. 7, 2012.

A transactions field 316 contains a characterization of the consumer's transaction with the business. In the depicted example, the consumer is characterized as having made an inquiry about the address of the business. In contrast, the interaction characterized by row 304 of the table indicates that the consumer sought a product return. A tracking ticket was created by the customer service representative and stored in the transactions field 316. The interaction characterized by row 306 of the table indicates that the consumer purchased an extended warranty associated with a product. It will be appreciated that a greater or lesser amount of information characterizing the transaction may be included in the transactions field, including a characterization about the particular product or service that was the subject of the inquiry from the consumer. In addition, an "other" field 318 may be populated by the business 116 or call center with any additional information that the business or call center is willing to provide about the consumer's interaction.

The data in table 300 is associated with a single business that receives calls from consumers. As such, the data will typically be associated with a single telephone number that is associated with that business. In some circumstances, a call center may be responsible for receiving calls for multiple businesses. In such a scenario, the call center may use a dialed number identification system ("DNIS") to determine which one of the multiple businesses it provides services for is being called. Such information is captured by the call center and may be added to the data provided in table 300. By doing so, the system 102 is able to form an association between the user's telephone number and the business that is being called.

It will be appreciated that while the information contained in table 300 is characterized as being received from a single business, the system 102 will typically receive information from multiple businesses. In those circumstances, the system may maintain multiple tables 300, each of which is associated with a corresponding business so that the system can track the source of the underlying data. Alternatively, each entry in a table 300 may have an assigned business ID so that the system can associate each entry in the table with the corresponding business from which it was received.

In some circumstances, tracking phone numbers may be used in the tracking of advertisement performance. In such a scenario, calls from consumers to different tracking phone numbers are re-routed to the same business. The tracking number that the consumer dialed may, however, be captured by the business and added to the data provided in table 300. By doing so, the system 102 is able to form an association between the user's phone number and the tracking number that was called.

It will be appreciated by one skilled in the art that the amount of interaction data that is provided by a business to the cross-channel advertising system 102 may vary from business-to-business. Some businesses 116 may be willing to provide significant details associated with consumer transactions, as doing so may allow the cross-channel advertising system 102 to better target advertisements to consumers that visit the business. Other businesses may be reticent to share much information with the advertising system 102, so may limit or curtail the amount of data that they provide to the system. In minimal circumstances, a business may be willing to provide a user phone number of a consumer and a time and data stamp of the call to facilitate targeting of advertisements by the advertising system 102.

The foregoing describes the manner in which the cross-channel advertising system 102 receives information associated with consumer 110 interactions with businesses 116 via voice channel 118. Returning to FIG. 1, the cross-channel advertising system 102 uses the information that it receives from publishers 112 as well as information that it receives from businesses 116 to populate the cross-channel targeting database 104. FIG. 4 is an example of a representative data table 400 containing identity, impression, and/or activity data that is generated by the cross-channel advertising system 102 and stored in cross-channel targeting database 104. The table 400 maintains a correlation between a masked user identifier provided by a publisher and a telephone number associated with the consumer. In addition, a confidence level may be stored for each stored tuple (i.e., telephone number, masked user identifier, publisher). The confidence level reflects the system's confidence that the user identifier and the corresponding telephone number are associated with the same consumer for the identified publisher.

Each row in the table 400 represents a user telephone number. The columns in the table 400 represent different masked user identifiers that have been identified as associated with the telephone numbers. The first field is a reference number field 410 that contains a unique identifier that is assigned by the advertising system 102 to the user telephone number. The reference number may be assigned by the advertising system for purposes of internal tracking. The first field is a user phone number field 412 that contains a phone number of the consumer. The phone number may be explicitly or implicitly supplied by the consumer. The second field is a masked user identifier field 414 that is populated with the identifier provided by the publisher. As previously discussed, masked user identifier is mapped by the publisher to a unique user identifier associated with the consumer or the consumer's device. As previously described, the masked user identifier is typically provided by a publisher or by a manufacturer of a computing device. The fourth field is a publisher field 416 that identifies the source of the masked user identifier. The fifth field is a confidence level field 418, reflecting a confidence of the system that the masked user identifier and the telephone number are indeed associated with the same consumer. A confidence level of 100% indicates that the system 102 has confirmed that the user identifier and telephone number are associated with the same consumer. A confidence level above 50% indicates that the system believes that the user identifier and telephone number are more likely than not associated with the same consumer, whereas a confidence level below 50% indicates that the system believes that the user identifier and telephone number are likely not associated with the same consumer. The masked user identifier 414, publisher 416, and confidence level 418 reflect data 420a received from a single publisher. The system 102 may receive data 420b . . . 420n from other publishers that are correlated to the same user telephone number 412. In such a case, the system 102 stores such data in association with the same telephone number so that it might be easily retrieved.

In some embodiments, publishers 112 or businesses 116 may have provided additional information to the system 102 that characterizes the consumer. For example, the publishers or businesses may have provided information characterizing advertisements presented to the consumer or purchases made by the consumer. In such a case, the cross-channel advertising system 102 may also store such information in table 400. An "other user information" field 422 is contained in the table in the event that the system 102 stores previous advertisements that were presented to the consumer or information such as the name, address, email, purchases, etc. of the corresponding consumer. Previous advertisements or purchases may be used by the system to identify, for example, those advertisements that are more or less effective on the consumer.

The cross-channel advertising system populates the table 400 using the data received from publishers 112 and businesses 116. For example, row 402 of the table reflects that the system has 90% confidence that the user identified by the user identifier "dofBUS" is associated with the phone number "206-555-1212." Such information and confidence level is derived from row 262 of table 250. In the interaction represented by row 262, the consumer provided a phone number to the publisher in conjunction with the purchase of a product. As such, the system may assume a high confidence that the provided number is accurate. The system may not assume a 100% confidence, however, because the phone number may not have been checked as part of the purchase process. As a second example, row 404 of the table 400 reflects that the system has 100% confidence that the user identified by the user identifier "53843DC484" is associated with the phone number "360-555-1234." Such information and confidence level is derived from row 202 of table 200. The system may assume a 100% confidence that the provided number is accurate based on knowledge of the publisher that provided the data. For example, if the publisher providing the data in table 200 requires a user to establish an account with the publisher, and if the publisher utilizes a verification process where a consumer must establish that the consumer has possession of a telephone by responding (e.g., by entering a security code) to a confirmation call made to the telephone, the system may assume a 100% confidence in the resulting correlation between masked user ID and user telephone number.

Rows 402 and 404 each represent scenarios where a single publisher provided the user identifier and the telephone number to the cross-channel advertising system 102. In contrast, row 406 represents a scenario where the system has only received a user identifier associated with a consumer from a publisher. As noted in row 260 of table 250, the consumer associated with the masked user identifier "asgIEB" has no corresponding phone number provided in user phone number field 214. In situations where a publisher does not have sufficient information to correlate a user identifier with a telephone number, the cross-channel advertising system 102 may rely on additional information provided from businesses 116, for example, in order to determine the correlation itself. One technique for assessing whether a user identifier might be associated with a telephone number is for the system to look for situations where a tracking phone number is displayed to a consumer in an advertisement at time A, and a call is received to that tracking phone number at time B, where time B is in close proximity to time A. If the call is received in sufficiently close time proximity, the system 102 may imply that the displayed advertisement caused the call to the tracking number, and that the user identifier associated with the advertisement therefore is the same consumer that placed the call. As an example, in table 250 it is noted that user "asgIEB" was displayed an advertisement containing a tracking number "{TRACKING #}" at Jul. 7, 2012, at 8:42 am. If, for sake of the example, the table 300 represented calls that are made to tracking number "{TRACKING #}", the system may search table 300 for calls that were received soon after 8:42 am on July 7th. As shown in row 302, a call is noted as having been received from a number "608-555-1212" at 8:45 am on July 7th. Because the call was received only 3 minutes after the advertisement was displayed, the system may assume that the consumer placing the call was the same as the consumer that viewed the advertisement. As such, in row 406 the system records a correlation between user identifier "asgIEB" and the telephone number "608-555-1212." Since the system cannot be certain that the consumer viewing the advertisement is the same as the consumer making the call, the system assigns a confidence level of 70% to the user identifier/telephone number pair. It will be appreciated that various methodologies may be used to derive the confidence level in such circumstances. For example, the closer in time between the advertisement and the receipt of the call, the higher the confidence level. The farther in time between the advertisement and the receipt of the call, the lower the confidence level.

Different models to determine confidence levels can be set by the system for each publisher. For those publishers that merely provide minimal information to the system, such as only the masked user identifier and phone number, the system may apply a default confidence level. The default confidence level may be based on, for example, the known practices of the publisher, the historical reliability of the publisher, or the general reliability of the class of publishers to which the publisher belongs. Publishers that publish advertisements more broadly across multiple websites or applications may have a lower confidence level, whereas publishers that publish in a more limited fashion (e.g., on a single website) may have a higher confidence level. As another example, the system may assign a higher confidence level if a publisher provides data that links the same masked user identifier to the same phone number multiple times (e.g., as a result of several interactions with a consumer). In contrast, the system may assign a lower confidence level if a publisher provides only a single instance that links a masked user identifier to a phone number.

While FIGS. 2-4 depict tables whose contents and organization are designed to make them more comprehensible by a human reader, those skilled in the art will appreciate that the actual data structure(s) used by the facility to store this information may differ from the tables shown, in that they, for example, may be organized in a different manner, may contain more or less information than shown, may be compressed and/or encrypted, and may be optimized in a variety of ways.

Figure 5:
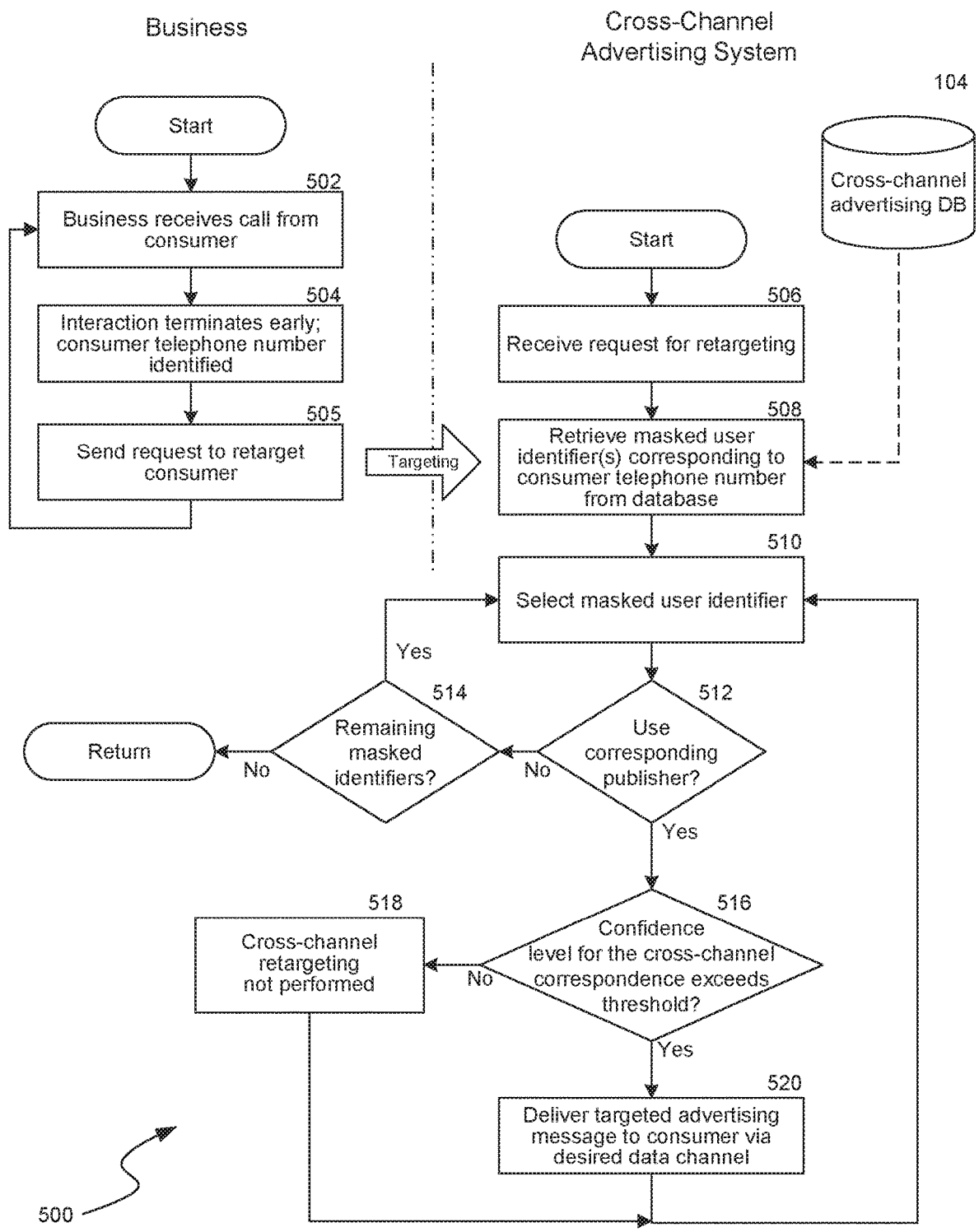
FIG. 5 is a flow diagram illustrating a process implemented by the cross-channel advertising system for performing cross-channel targeting of advertisements.

Once the cross-channel targeting database 104 has been built by the cross-channel advertising system 102, businesses and publishers may take advantage of the link between telephone numbers and user identifiers in order to better target consumers with advertisements. FIG. 5 is a flow diagram illustrating a process 500 implemented by the cross-channel advertising system 102 for performing cross-channel targeting of advertisements. The process 500 is performed in part or in full by the cross-channel advertising system 102. Some or all steps may be executed by the processor 120, and stored as computer executable instructions in the memory 122.

At a block 502, a business 116 receives a call from a consumer 110. For example, a consumer 110a may utilize phone 130 to dial the business number "1-800-NORTHCO." As was previously described, a call center may utilize automatic number identification or caller ID to determine the consumer phone number 128. The call center can also determine the dialed number (e.g., "1-800-NORTHCO"). The business 116a may store information such as an ANI-determined consumer phone number ("206-555-0001"), the time of the call, the number dialed, and so on, in table 300.

At a block 504, the business 116 determines that the consumer phone call terminated early. For example, the consumer 110a may have started a business transaction with the NorthCo call center, but the call may have been dropped or the consumer may have decided to not complete the transaction. An operator at the call center may enter an indication of the failure to complete the phone transaction that gets stored in the table 300, or the IVR system may store a current IVR state at the time of the call drop in the table 300. Although not shown in table 300, additional details may be stored, such as at what point in an IVR session (e.g., during which menu and state) the call terminated. For example, while using an IVR system the consumer may have reached a menu option requesting the consumer to enter credit card information. If the consumer did not have a credit card readily available, the consumer may have hung up the phone. In such circumstances, it may be especially advantageous for NorthCo to "re-target" the consumer in order to try to get the consumer to re-perform the transaction to completion.

At block 505, the business 116 sends a re-targeting request to the cross-channel advertising system 102. The re-targeting request includes the phone number of the consumer that is to be re-targeted. The re-targeting request may also include an indication of a particular advertising treatment or advertising campaign that is to be displayed to the targeted consumer. Depending on the relationship between the business and the cross-channel advertising system, the request may also include an amount that the business is willing to pay for the targeted advertisement. The amount paid for the advertisement may be on a per-impression basis, on a per-click basis, on a per-call basis, or based on some other agreed financial arrangement as is common in the online advertising industry. The business then continues to receive calls from additional consumers at block 502. Although FIG. 5 depicts a targeting request being made immediately after a terminated consumer interaction, it will be appreciated that the targeting request may be made periodically (e.g., hourly, daily, weekly) and encompass an aggregate number of consumers that the business is interested in targeting based on interactions with the consumer during the preceding period.

At block 506, the cross-channel advertising system 102 receives the request to re-target a consumer. As noted, the request includes the consumer phone number and an indication of a desired advertisement. The request may also include other information that the business would like to provide to facilitate the targeted advertising. For example, the request may include a desired time of day, cap on number of times an advertisement should be presented to a consumer, or desired price to generate the call from the consumer. In addition, the request may include a preference about the publisher or type of publisher with which the business is willing to advertise. Businesses may have strong preferences for certain types of publishers over others. Some publishers may have desirable brands with which the business would like to be associated. Other publishers may have weaker brands or content that a business would like to avoid. Using a blacklist or a whitelist, a business may therefore specify which publishers the business would like to avoid and/or which publishers the business would like to target. The publisher may be identified by name (e.g., a request to publish with the "New York Times"), the publisher may be identified by type (e.g., a request not to publish with any alcohol beverage manufacturers), or the publisher may be identified by other keyword or criteria limitation. If not specified by a business, the system may select publishers that are likely to provide the highest likelihood of success for the desired advertisements.

At a block 508, the system uses the received telephone number as an index to the cross-channel targeting database 104 to retrieve the masked user identifier corresponding to the telephone number from the database. For example, the system may use the number "608-555-1212" to retrieve the corresponding masked user identifier "asglEB" as shown in row 406 of table 400. The system also retrieves the publisher associated with the masked user identifier 414, as well as a confidence level of the associated user identifier. In the example, the retrieved publisher is "Google" and the confidence level is "70%." In the event that more than one masked user identifier is associated with the received telephone number, the system retrieves all masked user identifiers and associated publishers.

At a block 510, the system selects a first masked user identifier to analyze. At a decision block 512, the system determines whether the selected masked user identifier is associated with a desired publisher. As previously noted, businesses may desire that advertisements only be placed with certain publishers. If the publisher corresponding to the selected first masked user identifier is not a desired publisher, processing continues to a decision block 514 where the system determines whether any additional masked user identifiers remain to be analyzed. If no masked user identifiers remain to be analyzed, processing halts. Otherwise, processing returns to block 510 where the next masked user identifier is selected and the processing of blocks 512 repeats.

If the system determines that the selected masked user identifier is associated with a desired publisher at decision block 512, processing continues to a decision block 516. At decision block 516, the system compares the retrieved confidence level to a threshold desired confidence level. The desired confidence level may be configured by a system operator, may be determined by the business requesting the targeted advertisement, or may determined algorithmically to meet return on investment (ROI) goals of the advertising campaigns. For example, a business may specify that they do not want to target a consumer if the confidence that the user identifier is associated with the telephone number does not exceed 75%. If the confidence level does not exceed the desired threshold level at decision block 516, processing proceeds to block 518 where the advertising message is not targeted to the user identifier. If, however, the confidence level exceeds the threshold level at decision block 516, processing proceeds to a block 520.

At block 520, the system 102 causes a re-targeting message to be transmitted to the consumer via data channel 114 and the selected publisher 116. For example, the system may request that the corresponding publisher display a desired targeted advertisement or advertising campaign to the consumer the next time the consumer uses a web browser 136 to access a website of the publisher. The publisher identifies the consumer by the masked user identifier that is provided by the system 102. The publisher retrieves the unique user identifier that corresponds to the masked user identifier, and uses the unique user identifier to serve advertisements to the desired consumer. A publisher 116 may notify the system 102 when the requested advertising has been delivered to the desired consumer. If the requested advertising is not delivered to the desired consumer within a specified timeframe, the request by the system to have the advertisement be displayed by the publisher may lapse.

The delivered re-targeting message should ideally be tailored to encourage the consumer to complete the previously terminated engagement, or to otherwise reengage with the business. For example, the delivered advertising message may allow a consumer to bypass unnecessary menus that would otherwise make completing or reinitiating the transaction more cumbersome. For example, the consumer may be presented a special phone number for directly reaching a call center agent (e.g., bypassing the IVR) who can directly request the credit card information to complete the terminated transaction.

In some embodiments, the re-targeting message is further tailored based on other known information about the consumer. For example, the advertisement may be tailored based on past advertisements already displayed to the consumer, past purchases of the consumer, known likes or dislikes of a consumer, demographic information characterizing the consumer, etc.

In some embodiments, a business may be charged for an advertisement based on the confidence level associated with the targeted consumer. Advertisements that are targeted at user identifiers having a higher confidence level are charged more, and advertisements that are targeted at user identifiers having a lower confidence level are charged less. The differential charging is intended to compensate for the reduction in accuracy associated with targeting user identifiers having a lower confidence level.

In some embodiments, a publisher 112 will provide a masked user identifier to the cross-channel advertising system 102 and solicit advertisements to present to the masked user identifier. In such a scenario, the cross-channel advertising system 102 can determine whether any outstanding advertising requests remain to be targeted to the identified consumer and publisher. If advertising requests remain outstanding, the system responds to the publisher 112 with the desired advertising treatment for the consumer. In this fashion, the system may respond in an on-demand fashion in order to target consumers at the time that they visit a publisher website or application.

While the previously-provided example of re-targeting pertained to a consumer that had an interrupted transaction with a business, it will be appreciated that a business may opt to re-target consumers for a variety of reasons. For example, a business may desire to re-target a group of consumers that have recently purchased a particular product in the hope to upsell the consumers with warranty or extended service contracts, complementary products (e.g., cases, accessories, etc.), or other value-added product or service. As another example, businesses may wish to re-target consumers that they have recently lost. By offering a discount or other benefit to a consumer, the business may successfully convince the consumer to give the business a second chance. It will be appreciated that the disclosed technology allows businesses to target consumers for a variety of different reasons in a manner that is not very intrusive to the consumer.

In some embodiments, a business 116 may use the cross-channel advertising system 102 to target existing or new consumers, regardless of any prior interaction that the business may have had with the consumers. For example, a business may have generated a list of consumers and corresponding telephone numbers of the consumers that they are trying to reach. The list may be constructed, using third-party databases which allow consumers to be identified and selected based on various consumer characteristics (e.g., geography, demographics). The business can provide a list of consumer telephone numbers to the system, which can then target advertisements to those consumers using the methodology described herein. A business can measure the effectiveness of digital advertising (e.g., brand advertising) using the system 102 by determining whether advertising campaigns distributed in such a fashion generated incrementally more phone calls from consumers than consumers who were called or targeted through other traditional forms of media (e.g., print media).

On a periodic or continuous basis, the system 102 may audit the cross-channel targeting database 104 and remove or modify entries in the database to maintain the currency of the database. Entries in the database may be removed or modified based on a variety of factors. For example, the system 102 may remove any telephone numbers that haven't been targeted within a certain period (e.g., 1 year, 18 months). As another example, the system 102 may remove those masked user identifiers that are associated with publishers that have a tendency to underperform as compared to an average of all publishers or of like publishers. A continued underperformance of advertisements associated with a particular masked user identifier suggests that the confidence level between the masked user identifier and telephone number is likely wrong. For example, an individual may have borrowed a friend's phone to visit a website, and the identification of the individual by the publisher of the website has therefore proven to be an incorrect correlation with the telephone number of the phone. Rather than immediately delete a masked user identifier from the database, the system may instead decrease the confidence level to reflect the reduction in confidence that the telephone number is indeed associated with the consumer. Masked user identifiers having a confidence factor that falls below a certain threshold (e.g., 25%) may be automatically removed from the database.

Alternate Embodiments

In some embodiments, a customer relationship management (CRM) software system may assist the cross-channel advertising system 102 in associating additional user information with the information in the cross-channel targeting database 104. For example, a consumer's password, Social Security number, business account information, and so on may be beneficially linked, joined by, or augmented with the additional information in the cross-channel targeting database 104.

In some embodiments, the cross-channel advertising system 102 may receive information from publishers or businesses that allow multiple phone numbers to be associated with a unique user identifier. For example, a user may have a mobile phone, a work phone, and a home phone. In this case, the system 102 merely associates each phone number with the same user identifier. In this fashion, a business is able to target a consumer by providing any phone number associated with the consumer to the system.

In some embodiments, a consumer making a voice-over-Internet protocol (VoIP) phone call may expose a phone number in a session initiation protocol ("SIP") message setting up the session. The cross-channel advertising system 102 may use the header information to associate the consumer's phone number with a user identifier.

In some aspects, the system 102 will store information regarding how the user responds to a re-targeting message in order to track how effective re-targeting is for either that person individually, or collectively how effective the campaign is overall. This information may be used to refine parameters of the re-targeting campaign to improve its effectiveness.

Those skilled in the art will appreciate that the depicted flow charts may be altered in a variety of ways. For example, the order of the steps may be rearranged, steps may be performed in parallel, steps may be omitted, or other steps may be included. Those skilled in the art will further appreciate that the actual implementation of the database may take a variety of forms, and the term "database" is used herein in the generic sense to refer to any area that allows data to be stored in a structured and accessible fashion using such applications or constructs as databases, tables, linked lists, flat files, arrays, and so on.

It will be appreciated that the system 102 (and environment 100) include multiple elements coupled to one another and each element is illustrated as being individual and distinct. However in some embodiments some or all of the components and functions represented by each of the elements can be combined in any convenient and/or known manner or divided over multiple components and/or processing units. Furthermore the functions represented by the components can be implemented individually or in any combination thereof, in hardware, software, or a combination of hardware and software. Different and additional hardware modules and/or software agents may therefore be included in the environment 100 and/or system 102 without deviating from the scope of the disclosure.

We claim:

1. A method in a computing system for generating a dataset of correlations between user identifiers and telephone numbers, the method comprising:
    receiving, at a computing system, impression data characterizing exposures of users to a mechanism for contacting businesses, the impression data comprising, for each incidence of exposure to the mechanism, a user identifier used to track that a user was exposed, a phone number associated with the exposure, and a date and time associated with the exposure;
    receiving, at the computing system, call data describing telephone calls made to businesses, the call data comprising, for each call, a caller telephone number, a callee telephone number, and a date and time that the call was placed from the caller to the callee;
    determining, by the computing system, a correlation between a caller telephone number from the call data and a user identifier from the impression data by:
        identifying a callee telephone number from the call data;
        identifying, from the impression data, an exposure with an associated phone number that is the same as the callee telephone number;
        identifying, from the call data, a telephone call associated with the callee telephone number;
        comparing the date and time associated with the identified exposure to the date and time associated with the identified telephone call;
        forming a correlation between the user identifier of the identified exposure and the caller telephone number of the identified telephone call based on the comparison; and
        assigning a confidence level to the determined correlation based on the compared date and time; and
    storing, in a correlation dataset, a correlation entry comprising the caller telephone number, the user identifier, and the confidence level.

2. The method of claim 1, wherein the exposure to the mechanism for contacting businesses occurs on websites or applications.

3. The method of claim 1, wherein the exposure to the mechanism for contacting businesses occurs in advertisements.

4. The method of claim 1, wherein a user identifier is associated with a computing device used by a consumer to access a publisher website or application over a data channel.

5. The method of claim 4, wherein the user identifier is a cookie or an International Mobile Station Equipment Identity (IMEI).

6. The method of claim 1, wherein the confidence level reflects a likelihood that a user associated with the user identifier is the same user as is associated with the caller telephone number.

7. The method of claim 1, wherein comparing the date and time associated with the identified exposure to the date and time associated with the identified telephone call comprises:
    evaluating instances in which the date and time of the corresponding call are after and proximate to the date and time of the identified exposure.

8. The method of claim 7, wherein the time of the corresponding call is within three minutes of the time of the identified exposure.

9. The method of claim 1, further comprising:
    receiving a request from a business to re-target a consumer associated with a caller telephone number;
    retrieving from the correlation dataset a correlation entry associated with the caller telephone number, the correlation entry comprising a user identifier and confidence level;
    determining whether the confidence level satisfies a confidence threshold; and
    based on the determination, transmitting a request to a publisher associated with the user identifier to cause an advertisement to be presented to a user associated with the user identifier via a publisher website or application.

10. A non-transitory computer-readable medium encoded with instructions that, when executed by a processor, perform a method for generating a dataset of correlations between user identifiers and telephone numbers, the method comprising:

receiving, at a computing system, impression data characterizing exposures of users to a means for contacting businesses, the impression data comprising, for each incidence of exposure to the means, a user identifier used to track that a user was exposed, a phone number associated with the exposure, and a date and time associated with the exposure;

receiving, at the computing system, call data describing telephone calls made to businesses, the call data comprising, for each call, a caller telephone number, a callee telephone number, and a date and time that the call was placed from the caller to the callee;

determining, by the computing system, a correlation between a caller telephone number from the call data and a user identifier from the impression data by:
  identifying a callee telephone number from the call data;
  identifying, from the impression data, an exposure associated with a phone number that is the same as the callee telephone number;
  identifying, from the call data, a telephone call associated with the callee telephone number;
  comparing the date and time associated with the identified exposure to the date and time associated with the identified telephone call;
  forming a correlation between the user identifier of the identified exposure and the caller telephone number of the identified telephone call based on the comparison; and
  assigning a confidence level to the determined correlation based on the compared date and time; and
storing, in a correlation dataset, a correlation entry comprising the caller telephone number, the user identifier, and the confidence level.

11. The non-transitory computer-readable medium of claim 10, wherein the exposure to the means for contacting businesses occurs on websites or applications.

12. The non-transitory computer-readable medium of claim 10, wherein the exposure to the means for contacting businesses occurs in advertisements.

13. The non-transitory computer-readable medium of claim 10, wherein a user identifier is associated with a computing device used by a consumer to access a publisher website or application over a data channel.

14. The non-transitory computer-readable medium of claim 13, wherein the user identifier is a cookie or an International Mobile Station Equipment Identity (IMEI).

15. The non-transitory computer-readable medium of claim 10, wherein the confidence level reflects a likelihood that a user associated with the user identifier is the same user as is associated with the caller telephone number.

16. The non-transitory computer readable medium of claim 10, wherein comparing the date and time associated with the identified exposure to the date and time associated with the identified telephone call comprises:
  evaluating instances in which the date and time of the corresponding call are after and proximate to the date and time of the identified exposure.

17. The non-transitory computer-readable medium of claim 16, wherein the time of the corresponding call is within three minutes of the time of the identified exposure.

18. The non-transitory computer-readable medium of claim 10, further encoded with instructions that when executed by the processor perform the method for generating a dataset of correlations between user identifiers and telephone numbers, the method further comprising:
  receiving a request from a business to re-target a consumer associated with a caller telephone number;
  retrieving from the correlation dataset a correlation entry associated with the caller telephone number, the correlation entry comprising a user identifier and confidence level;
  determining whether the confidence level satisfies a confidence threshold; and
  based on the determination, transmitting a request to a publisher associated with the user identifier to cause an advertisement to be presented to a user associated with the user identifier via a publisher website or application.

* * * * *